Nov. 10, 1970
R. ZECHLIN
3,539,890
SYNCHRONOUS MOTOR STATIC STARTING CONTROL
Filed July 11, 1967
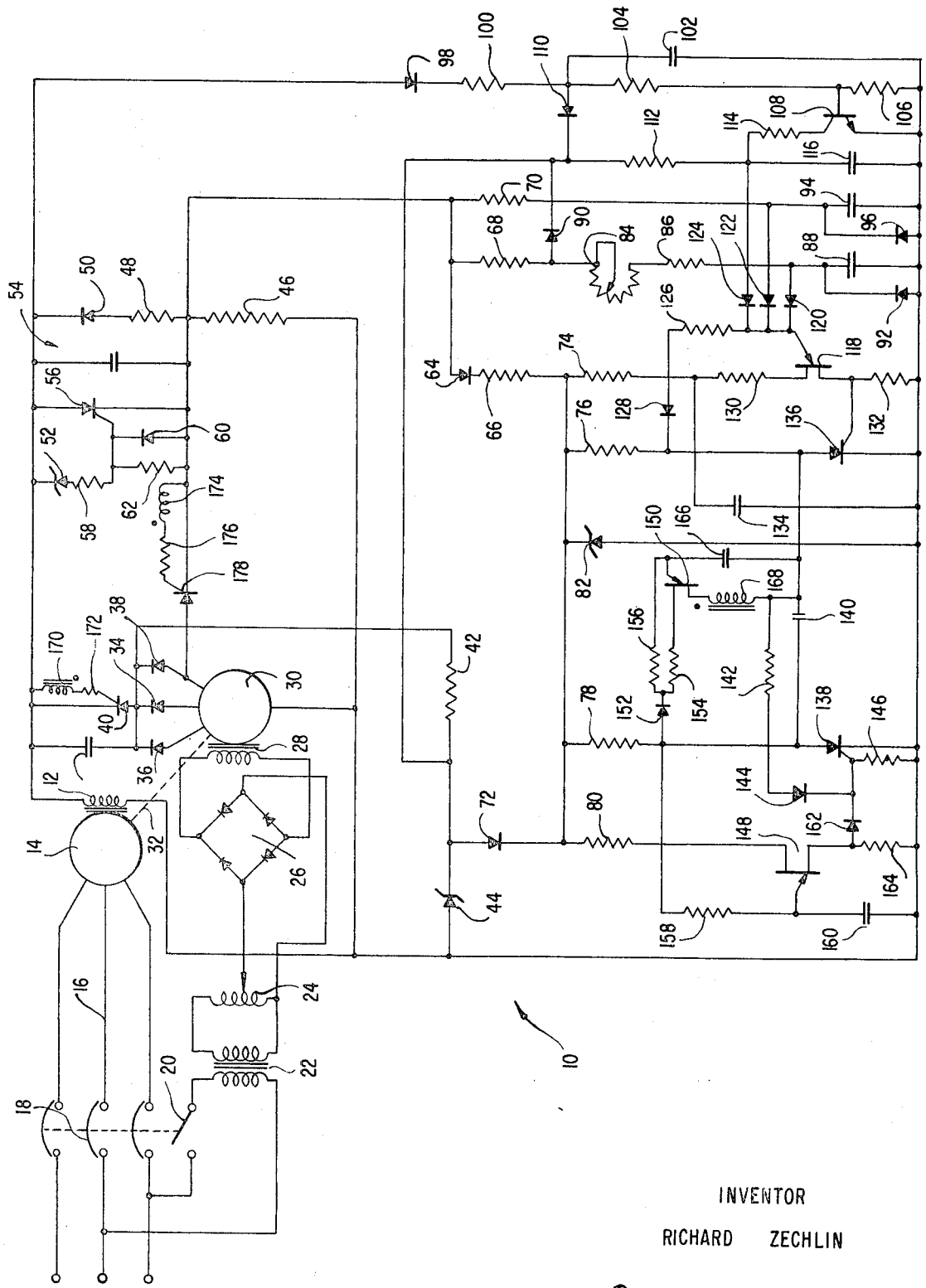
INVENTOR
RICHARD ZECHLIN
BY Daniel W Sibley
ATTORNEY

United States Patent Office 3,539,890
Patented Nov. 10, 1970

3,539,890
SYNCHRONOUS MOTOR STATIC
STARTING CONTROL
Richard Zechlin, Beloit, Wis., assignor to Fairbanks
Morse Inc., New York, N.Y., a corporation of Delaware
Filed July 11, 1967, Ser. No. 652,530
Int. Cl. H02p 1/50
U.S. Cl. 318—181                               8 Claims

ABSTRACT OF THE DISCLOSURE

The synchronous motor static starting control constitutes a static semiconductor control circuit for a synchronous motor and exciter which are mounted on a common shaft. The static starting control connects a resistive circuit across the motor field while the motor is accelerating toward synchronous speed, measures the slip frequency of the motor, and at an adjustable slip frequency applies the output of the exciter to the motor field at a relatively fixed portion of the slip frequency waveform to provide high pull in torque. The control circuit disconnects the resistive circuit after the exciter output is applied to the motor field and monitors the resistive circuit thereafter. Also the control circuit resynchronizes the motor in case it is pulled out of synchronism and reapplies the motor field if the exciter output is temporarily disconnected or drops to a low value.

---

This invention relates to synchronous motor controls generally, and more particularly to a novel synchronous motor static starting control.

Synchronous motors are in general started by means similar to that of an ordinary induction motor. Built into the field pole structure of a synchronous motor are squirrel cage bars and end rings like an induction motor, and by the judicious selection of the electrical characteristics of the bars and their placement in the magnetic structure, a desired speed-torque characteristic of the motor can be achieved. However, in general synchronous motors rely upon induction motor principles to start and accelerate the motor to nearly synchronous speed, whereupon a direct current is applied to the rotor field of the motor causing the rotor to pull into step with the field rotating about the stator. In conventional synchronous motors, this direct current for the rotor field is provided by driven exciter units which are either directly connected or connected by slip rings or brushes to the rotor field.

The rotor or motor field consists of a relatively large number of turns per pole as compared to the number of squirrel cage bars per pole and the voltage applied to the stator with the rotor at standstill induces a very high voltage in the field winding. This high voltage can cause damage to the field circuit unless the field winding is provided with a current path through a resistive circuit or otherwise protected to limit the induced voltage developed thereon during motor starting.

With the synchronous motor field winding connected to a resistive circuit during motor starting, it is necessary to sense when the motor is approaching synchronous speed so that the output of an exciter can be applied to furnish the necessary DC voltage to the field winding before the resistive circuit is removed therefrom. It is also desirable to provide high pull-in torque at the time of application of the exciter output to the motor field.

After the motor reaches synchronous speed, should the motor be pulled out of synchronism by a high temporary overload requirement, it is necessary to resynchronize the motor. Also, it may be necessary to reapply the motor field if the exciter output is disconnected or temporarily drops to a low value.

A primary object of this invention is to provide a novel and improved synchronous motor static starting control which employs static circuit components to provide a compact durable control circuit.

Another object of this invention is to provide a novel and improved synchronous motor static starting control incorporating novel control circuitry adapted to be carried by the rotor of a brushless synchronous motor.

A further object of this invention is to provide a novel and improved synchronous motor static starting control operative to connect a resistive circuit to the motor field terminals when the motor is accelerating toward synchronous speed.

Another object of this invention is to provide a novel and improved synchronous motor static starting control operative to measure the slip frequency of a motor and to apply the output of a rotating brushless exciter to the motor field terminals at an adjustable slip frequency.

A further object of this invention is to provide a novel and improved synchronous motor static starting control which is operative to apply the output of a rotating brushless exciter to the motor field terminals at a relatively fixed portion on the slip frequency waveform to provide high pull-in torque at the time of application of the exciter output.

Another object of this invention is to provide a novel and improved synchronous motor static starting control operative to disconnect a resistive current path from the motor field terminals after an exciter output has been applied to such terminals.

A further object of this invention is to provide a novel and improved synchronous motor static starting control operative to provide automatic resynchronization in case the motor is pulled out of synchronism by a temporary high overload requirement.

Another object of this invention is to provide a novel and improved synchronous motor static starting control operative to automatically reapply motor field control to the motor if the exciter output to such field is temporarily disconnected or goes to a low value.

A still further object of this invention is to provide a novel and improved synchronous motor static starting control which monitors the energization of a resistive circuit for the motor field after exciter output is applied to the motor field and automatically disconnects such circuit from the exciter output should excessive energization thereof occur.

These and other objects and details of the invention will be readily apparent upon a consideration of the following specification and appended claims taken in conjunction with the accompanying drawing. The drawing is a circuit diagram of a preferred form of the synchronous motor static starting control of the present invention.

Referring now to the drawing, the synchronous motor static starting control circuit of the present invention indicated generally at 10 is electrically connected to the motor field 12 of a synchronous motor 14. The motor 14 receives incoming three-phase power from a power source, not shown, through input power lines 16, which provide a voltage suitable for operation of the synchronous motor to the stator of the motor. To control the application of power to the terminals of the synchronous motor, a control switch 18 is provided in the input lines 16. Operation of this switch causes power to be provided to the motor 14 and also results in the closing of a ganged switch 20 to complete a power circuit for a transformer 22, the primary winding of which is now connected across two of the input lines. The transformer 22 provides power across a variable voltage unit 24 and a full-wave rectifier bridge 26 to the field 28 of an exciter 30. Current is now caused to flow in the field 28 of the exciter.

The exciter 30 and the motor 14 are mounted upon the same shaft 32 so that the output of the exciter can be fed directly to the field 12 of the motor without the necessity of employing slip rings between the exciter output and the motor field. The exciter is essentially an alternator with a revolving armature and a stationary field, and as the synchronous motor 14 starts from rest and accelerates toward synchronous speed, the exciter will produce a three-phase output voltage which is proportional to speed. The output of the exciter is half wave rectified by rectifiers 34, 36 and 38, the combined rectified output therefrom appearing at the anode of a controlled rectifier 40. The rectifier 40 constitutes a conventional controlled rectifier having an anode electrode connected to receive the output from the diode rectifiers 34, 36 and 38, a gate electrode and a cathode electrode connected to the motor field winding 12. Thus, the exciter and its output rectifier structure, which is connected across the motor field 12, provide an exciter developed voltage for the motor field. However, this exciter field voltage is blocked until the controlled rectifier 40 is gated into conduction.

The rectified exciter output is also fed from the rectifiers 34, 36 and 38 through a resistor 42 and a Zener diode 44 back to the common connection of the exciter 30. At relatively high motor slip, the output of the exciter 30 is sufficient to maintain a substantially fixed Zener voltage on the cathode of the Zener diode 44. This Zener voltage is applied to the various motor control circuits to be subsequently described.

In the manner well known to synchronous motors, stator current flowing in the stator of the motor 14 induces voltage in the motor field 12. During the motor starting period, the motor field will have a very high induced EMF from the changing flux in the air gap of the motor caused by the stator current, and means must be provided to furnish a current path for the motor field during this period. This current path will operate to produce ampere turns that oppose the changing flux that induces the field voltage, thus reducing the induced field voltage. The current path for the motor field 12 is provided by means of resistors 46 and 48 connected in series with a diode 50 across the motor field.

During starting of the motor 14, when the induced voltage in the motor field passes into what will be denoted as a positive half cycle of the induced voltage wherein the top terminal of the motor field in the drawing is positive and the lower terminal is negative, there will momentarily be no current path through the resistors 48 and 46 due to the current blocking action of the diode 50. Therefore, there will be a momentary rapid rise in the induced voltage across the motor field until the Zener voltage of the Zener diode 52 is reached. This Zener diode forms a control element for a parallel circuit 54 across the resistor 48 and diode 50. The parallel circuit includes the Zener diode 52 connected to the upper terminal of the motor field, a controlled rectifier 56 having an anode connected to the upper terminal of the motor field, a cathode connected to an upper terminal of the resistor 46, and a control electrode connected to a resistor 58 in series with the Zener diode 52. The parallel circuit 54 is completed by a diode 60 and a resistor 62 which are connected in parallel between the gate electrode of the rectifier 56 and the resistor 58 and the upper terminal of the resistor 46.

When the positive excursion of the induced voltage on the motor field reaches the Zener voltage of the Zener diode 52, current flows through the Zener diode, the resistor 58, and the parallel paths through the resistor 62 and the gate to cathode circuit of the controlled rectifier 56. This current flow causes the controlled rectifier to conduct and provide a current path for the motor field 12 through the controlled rectifier 56 and the resistor 46 back to the motor field. The time interval between the flow of current through the Zener diode 52 and the conduction of the controlled rectifier 56 is extremely short, so that the current flow through the resistor 46 is essentially the same as if the resistor was connected directly to the motor field terminals.

When the induced voltage in the motor field 12 passes to the negative half cycle of the induced voltage cycle wherein the lower terminal of the motor field in the drawing is positive, current will flow directly through the resistor 46, the resistor 48, and the diode 50 to the upper terminal of the motor field. As the motor 14 accelerates, the frequency of the induced voltage across the motor field terminals is reduced and is equal to the slip times the impressed stator frequency where slip is:

$$\frac{\text{motor synchronous RPM-actual motor RPM}}{\text{motor synchronous RPM}}$$

The voltage induced in the motor field 12 is not greatly affected by the value of slip except at speeds near the motor synchronous speed, where the motor field circuit becomes pronouncedly resistive in nature. At zero slip, the induced field voltage will be zero as there is no relative movement between the motor field poles and the rotating flux caused by the stator currents.

Turning now to the remainder of the control circuitry for the synchronous motor 14, it will be noted that during the positive excursions of the induced motor field voltage when the controlled rectifier 56 conducts, the upper terminal of the resistor 46 will become positive. This positive resistor voltage is developed in three parallel paths across a series rectifier 64 and resistor 66, a resistor 68, and a resistor 70.

The voltage across the rectifier 64 and resistor 66 provides voltage to the blocking end of a rectifier 72, such voltage also being developed across resistors 74, 76, 78, and 80 as a voltage for control circuits to be subsequently described. This control circuit voltage is controlled in amplitude during practically all of the positive half cycle of the induced field voltage by a Zener diode 82, the Zener voltage of which is greater than that of the Zener diode 44. As the magnitude of the induced field voltage in the field 12 is greater than that of the Zener voltage for the Zener diode 44, the control voltage developed across the rectifier 64 and the resistor 66 will be maintained at the Zener voltage of the Zener diode 82 for nearly the whole positive half cycle of induced field voltage. During this time, the rectifier 72, which is connected to the Zener diode 44 with the blocking end thereof receiving the control voltage, will be reverse biased.

The second parallel path for the induced positive field voltage developed across the resistor 68 includes a variable resistor or rheostat 84, a resistor 86, and a capacitor 88. The voltage in this second path will be held at the Zener voltage level of the Zener diode 44 for most of the positive half cycle of the field voltage across the motor field 12, for the second parallel path is connected directly to the Zener diode 44 through a rectifier 90. Thus, as the magnitude of the positive induced voltage in the motor field is high relative to the Zener voltage of the Zener diode 44, the bottom terminal of the resistor 68 will be maintained at the Zener voltage level for substantially the complete positive half-cycle of the induced field voltage. Current flow during this time in the second current path charges capacitor 88, the capacitor charging speed being determined by the rheostat 84. The capacitor is shunted by a diode 92.

The third parallel path for the positive voltage from the upper terminal of the resistor 46 includes the resistor 70 and a capacitor 94 shunted by a diode 96. Current flow in this third parallel path operates during the positive excursion of the induced field voltage to charge the capacitor 94.

Also during the positive half cycle of the induced field voltage, a direct path is provided for the field voltage through a rectifier 98 connected in series with a resistor 100. This voltage, which is developed across the resistor 100, causes current to flow in a parallel path to charge a capacitor 102 and through resistors 104 and 106 to provide a base to emitter flow through a transistor 108. A rectifier 110 connected between the capacitor 102 and the Zener diode 44 prevents the voltage on the capacitor from exceeding the Zener voltage of the Zener diode.

The base to emitter current in the transistor 108 causes collector current to flow through a resistor 112 which is connected between the Zener diode 44 and the resistor 42. This collector current then flows through a collector resistor 114 and the collector-emitter circuit on the transistor 108, and causes a charge to be developed on a capacitor 116 which is connected across the collector-emitter circuit of the transistor. The resistance of the collector resistor 114 is small compared to the resistance of the resistor 112, so that the capacitor 116 can only charge to a low value of voltage.

During the negative half cycle of the induced field voltage across the motor field 12, the rectifier 98 operates to block current flow through the resistor 100. However, the capacitor 102 discharges to maintain the voltage across the resistors 104 and 106 throughout the negative half cycle of induced field voltage, and therefore a continuous base to emitter current flows in the transistor 108. This transistor current flow causes the charge to be maintained at a low value on the capacitor 116.

Also, during the negative half cycle of induced field voltage, current will flow through the resistor 46, the resistor 48, the rectifier 50, and back to the upper terminal of the motor field. The rectifier 64 blocks current flow through the resistor 66, and the control circuit voltage developed across the resistors 74, 76, 78, and 80 is determined by the Zener diode 44 and the rectifier 72.

Additionally, current will flow in the second parallel path from the lower positive terminal of the field winding to the capacitor 88, until the rectifier 92 conducts. This current flow also passes through the resistor 86, and the rheostat 84, and therefore the rectifier 90 will be back biased. The rectifier 92 insures that the capacitor voltage of the capacitor 88 will be nearly zero at the start of each positive cycle of induced field voltage.

Similarly during the negative half cycle of induced field voltage, current also flows to the capacitor 94 until the diode 96 conducts, and then through the resistor 70. Like the diode 92, the diode 96 insures that the capacitor voltage for the capacitor 94 is nearly zero at the start of each positive half cycle of induced field voltage.

As previously indicated, as the motor 14 accelerates, the frequency of the induced voltage across the motor field 12 decreases and is equal to the slip frequency. Initially, at high values of slip, the available charging time for the capacitor 88 is small due to the short period of time required for the induced field voltage to pass through its positive half cycle, and therefore at the end of the positive half cycle of induced field voltage, the charge voltage on the capacitor 88 is low. However, the slip decreases as the motor approaches synchronous speed, and the frequency of the induced field voltage decreases correspondingly. Thus, the charging time for the capacitor 88 during the positive half cycle of induced field voltage increases.

At a slip value determined by the rheostat 84, the capacitor 88 will have sufficient time to charge to a value which is slightly in excess of the peak point voltage of a unijunction transistor 118 when such peak point voltage is controlled by the Zener diode 44. It will be noted that the capacitor 88 is connected to the emitter electrode of the unijunction transistor 118 by a diode 120 while similarly a diode 122 so connects the capacitor 94 and a diode 124 so connects the capacitor 116. Additionally, the diodes 120, 122 and 124 connect the capacitors to a controlled discharge path formed by a resistor 126 and a diode 128. The purpose of this controlled discharge path will be subsequently described.

Considering now the action of the capacitor 88, as the duration of the positive half cycle of induced field voltage increases with a corresponding decrease in the frequency thereof, the charge on the capacitor increases until it reaches a point determined by the rheostat 84. At this point, the charge on the capacitor will not exceed the peak point voltage of the unijunction transistor 118 during the positive half cycle of induced field voltage, for, as previously described, during this positive half cycle the control circuit voltage level is determined by the Zener voltage of the Zener diode 82. This Zener voltage is developed across the resistor 74 and a resistor 130 to provide base two voltage for the transistor 118. As the Zener voltage of the Zener diode 82 is higher than the Zener voltage of the Zener diode 44, the Zener diode 82 controls the base two voltage and the peak point voltage of the unijunction transistor 118 during most of the positive half cycle of induced field voltage. With the peak point voltage of the unijunction transistor so controlled, a charge on the capacitor 88 which exceeds the Zener voltage of the Zener diode 44 will not exceed the peak point voltage of the unijunction transistor.

At the end of the positive half cycle of induced field voltage, the control voltage across the resistors 74, 76, 78 and 80 falls to the value of the Zener voltage for the Zener diode 44, and at this time, the voltage from the charged capacitor 88 applied to the emitter of the transistor 118 will cause the transistor to fire. A pulse will now be developed across a base one electrode resistor 132. A capacitor 134 connected across the base one-two electrode circuit of the transistor 118 prevents rapid changes in the base two voltage and is useful at high slip frequencies to maintain the base two voltage before the output from the exciter 30 is sufficient to maintain the Zener diode 44 at Zener voltage.

The circuit constants of the control circuit are arranged so that regardless of the fact that the capacitors 88, 94 and 116 are all connected to the emitter electrode of the transistor 118, the capacitor 88 will control the firing of the transistor during a normal motor starting sequence rather than the capacitor 94. The capacitor 116 is maintained at a low voltage by the action of the transistor 108, and therefore the charge developed from this capacitor is not sufficient to fire the transistor 118.

The output pulse from the unijunction transistor 118 developed across the base one resistor 132 provides a control pulse to the gate electrode of a controlled rectifier 136. The controlled rectifier 136 with a controlled rectifier 138, a capacitor 140, and resistors 76 and 78 is connected to form an electrical flip-flop circuit. It will be noted that the anodes of the controlled rectifiers 136 and 138 are connected together by the capacitor 140, while the resistor 76 is connected to the anode of the controlled rectifier 136 and the resistor 78 is connected to the anode of the controlled rectifier 138. The capacitor 140 is shunted by a parallel circuit including a resistor 142 connected in series with a diode 144, which is in turn connected to the gate electrode of the controlled rectifier 138. Also, a resistor 146 is connected to the gate electrode of this controlled rectifier.

In the operation of the flip-flop circuit, the controlled rectifier 138 is normally rendered conductive by the action of current flowing through the resistor 76, the resistor 142, the rectifier 144, and the gate to cathode circuit of the controlled rectifier 138. At the same time, controlled rectifier 136 is normally nonconductive.

The state of the controlled rectifier 138 operates to determine the operation of two unijunction transistors 148 and 150. The unijunction transistor 150 includes a base one electrode which is connected to the resistor 78 by means of a rectifier 152 and a base two resistor 154. Additionally, a resistor 156 is connected between the rectifier 152 and the emitter electrode of the unijunction transistor 150.

Also, the resistor 78 is connected to a resistor 158 which, with a series capacitor 160, forms an emitter circuit for unijunction transistor 148. The base two electrode of the unijunction transistor 148 is connected to the resistor 80, while the base one electrode is connected by means of a circuit formed by a rectifier 162 and a resistor 164 to the gate of the controlled rectifier 138.

When the controlled rectifier 138 is in a normally conducting state, the rectifier 152 is reverse biased to prevent operation of the unijunction transistor 150. Also, the conduction through the controlled rectifier 138 prevents operating voltage from being developed across the resistor 158, and the unijunction transistor 148 is not operative.

A gate pulse across the resistor 132 from the unijunction transistor 118 causes the controlled rectifier 136 to conduct, and capacitor 140 terminates the conduction of the controlled rectifier 138 due to the discharge capacitor current flowing in the reverse direction in the controlled rectifier. With the controlled rectifier 136 conductive and the controlled rectifier 138 nonconductive, the reverse bias is removed from the rectifier 152 and the unijunction transistor 150 is rendered operative. A capacitor 166 connected to the emitter electrode of the unijunction transistor 150 combines with the resistor 156 to form a RC timing circuit for the transistor, and this RC timing circuit causes short transistor output pulses from the base one electrode to be developed across a transformer primary winding 168. These pulses from the primary winding are transmitted to a first transformer secondary winding 170 connected through a resistor 172 to the gate electrode for the controlled rectifier 40. Also the pulses are transmitted to a second transformer secondary winding 174 which is connected by means of a resistor 176 to the gate electrode for a second controlled rectifier 178. The pulse from the secondary winding 170 causes conduction of the controlled rectifier 40 so that the rectified output from the exciter 30 is provided to the motor field 12. At the same time, the pulse from the secondary winding 174 causes conduction of the controlled rectifier 178, and it will be noted that this controlled rectifier is connected to one of the three-phase output terminals of the exciter 30 as well as to the upper terminal of the resistor 46. Thus, upon conduction of the controlled rectifier 178, half wave current is allowed to flow through the resistor 46 with one phase of the exciter as the source, and the complete exciter output from the controlled rectifier 40 is not permitted to flow through the resistor 46. This complete exciter output flow might occur if the controlled rectifier 178 were omitted and the controlled rectifier 56 was conducting when the controlled rectifier 40 is gated on.

In addition to the unijunction transistor 150 which becomes operative when the controlled rectifier 138 becomes nonconductive, the unijunction transistor 148 is also triggered into operation. A current now flowing through the resistors 78 and 158 causes the capacitor 160 to charge, and when the charge on the capacitor reaches the peak voltage point of the transistor 148, an output voltage pulse is developed across the resistor 164. This output voltage pulse is also passed across the rectifier 162 to the gate electrode of the controlled rectifier 138, and operates to reinitiate conduction of the controlled rectifier. As the capacitor 140 is now recharged by the current flow through the controlled rectifier 136, the current flowing in a reverse direction through the controlled rectifier 136 operates to terminate conduction of rectifier 136. The unijunction transistors 148 and 150 now again becomes inoperative, but the controlled rectifier 40 continues to conduct on account of the continuous forward current flow provided by the output of the exciter 30. Also, the controlled rectifier 178 will continue to conduct until an excursion of the phase voltage of the exciter causes the anode of controlled rectifier 178 to become negative with respect to the cathode of the controlled rectifier.

With the controlled rectifier 40 conducting, the controlled rectifier 56 remains nonconductive, because the output voltage from the exciter 30 is lower in magnitude than the Zener voltage of the Zener diode 52.

When the controlled rectifier 136 is conducting, the resistor 126 and diode 128 provide a discharge path for the capacitors 88, 94, and 116 to insure that the operation of controlled rectifier 138 is controlled by the unijunction transistor 148 and not by some charging action of the capacitors.

In the operation of the synchronous motor static starting control 10, when the switches 18 and 20 are closed and power is furnished to the stator of the motor 14, the exciter 30 is energized and an induced voltage is developed across the field 12 of the motor. The motor field is then shorted to carry the induced field current during motor starting through the resistor 46, the resistor 48, and the diode 50 when one terminal of the motor field is positive and subsequently, when the remaining terminal is positive, and the Zener voltage in the Zener diode 52 is reached, through the controlled rectifier 56 and the resistor 46. During this shorting of the motor field, the exciter output to the motor field is blocked by the controlled rectifier 40, but the output of the exciter is fed to the Zener diode 44 to provide a reference voltage.

During the acceleration period when the synchronous motor 14 is accelerating toward synchronous speed, the slip frequency of the motor is sensed so that the exciter output can be applied to the motor field 12 at an adjustable slip frequency. It is also desirable to apply the exciter output at a relatively fixed portion of the slip frequency wave form to provide a high pull-in torque at the time that the exciter output is applied to the motor field. To accomplish this, the resistance of the rheostat 84 is preadjusted to set the slip frequency level at which the capacitor 88 will sustain a charge sufficient to fire the unijunction transistor 118. The point at which the capacitor 88 is permitted to fire the unijunction transistor is determined by the Zener voltage level reference provided by the Zener diode 44, for, as previously described, when the Zener diode 82 controls the peak voltage point of the unijunction transistor 118, the charge across the capacitor 88 is never sufficient to fire the unijunction transistor. This is extremely important, for it insures that the unijunction transistor can be fired only as the induced field voltage is falling at the end of a positive cycle, for it is at this point that the reference voltage supplied to the unijunction transistor by the Zener diode 44 replaces that supplied during the remainder of the positive half cycle of induced field voltage by the Zener diode 82. By firing the unijunction transistor at this point and causing the exciter output voltage to be applied to the motor field, it will be apparent that the field current will continue to change at a maximum rate, essentially going through zero, and will provide the best pull-in possible for the motor. Thus, the rheostat 84 and the capacitor 88 provide a voltage which, when compared with the peak voltage of the unijunction transistor 118 as determined by the Zener control voltage from the Zener diode 44, determines the slip frequency at which the exciter output will be applied to the motor field, while the shift in the reference voltage for the unijunction transistor 118 from the Zener voltage of the Zener diode 82 to the Zener voltage of the Zener diode 44 determines the point on the slip frequency curve when such exciter output shall be applied.

The resistor circuit shunting the motor field 12 is disconnected from the motor field after the exciter output is applied thereto by the action of the controlled rectifier 178 which operates to disconnect the resistor 46. This is due to the fact that the cathode of the controlled rectifier 178 is slightly higher in voltage than the cathode of the controlled rectifier 40 when the output phase of the exciter output to which the controlled rectifier 178 is connected is at its most positive point. This higher voltage at the cathode of the controlled rectifier 178 provides a blocking voltage to the controlled rectifier 56 which will cause this rectifier to shut off and block the flow of motor field current through the resistor circuit provided by the resistor 46.

If the motor 14 is pulled out of synchronism by a temporary high overload requirement after the motor has reached synchronous speed with the exciter output applied to the field winding 12, it is necessary to automatically resynchronize the motor before severe current or torque pulsations can occur. If the motor should pull out of synchronism due to temporary overload, the voltage induced in the field 12 will be in excess of that supplied by the exciter 30. This excess field voltage will block the controlled rectifier 40 causing the controlled rectifier to shut off, while the increase in field voltage will also rise to the Zener voltage point of the Zener diode 52, thereby causing the Zener diode to resume conduction. This conduction will furnish the gating potential to reinitiate conduction of the controlled rectifier 56, and the normal starting sequence, previously described will be resumed. Thus, the motor will again be brought up to synchronous speed.

If, after the output of the exciter 30 is applied to the motor field winding 12, some transient condition causes the controlled rectifier 40 to cease conduction, the exciter output will be disconnected from the motor field. Should such a malfunction in either the controlled rectifier 40 or the exciter 30 cause the exciter output to go to a low value or cease when the motor is lightly loaded, the synchronous motor with salient poles can stay at synchronous speed, but its ability to draw leading reactive power vanishes until exciter output is again applied to the field winding 12. If the exciter output is terminated and the motor is running synchronously, the capacitor 102 which has been charged as previously described, will now discharge through the resistors 104 and 106. When the capacitor 102 has discharged and base current ceases in the transistor 108, the collector current through the resistor 114 also ceases and the capacitor 116 charges. When the voltage on the capacitor 116 exceeds the peak point of the unijunction transistor 118, the unijunction transistor fires and provides a gate pulse to the gate of the controlled rectifier 136. The controlled rectifier 136 now operates in conjunction with the controlled rectifier 138 in the manner previously described to provide a gate pulse to the controlled rectifier 40 and the controlled rectifier 178, and the controlled rectifier 40 is again pulsed on to provide the output of the exciter 30 to the field winding 12. This restores the system to normal operation.

During the period that the output of the exciter 30 is applied to the motor field, it is desirable to monitor the resistor 46 to assure that it is not continuously provided with field current. This resistor might burn up if subjected to a prolonged application of exciter output power, for normally the resistor is a short duty time resistor.

Excessive exciter output power would be applied to the resistor 46 if the controlled rectifier 56, due to some transient condition, conducts after the motor has reached synchronous speed. In the case of such conduction, the capacitor 94 will charge through the resistor 70. Although the peak voltage point of the unijunction transistor 118 will be controlled by the Zener voltage of the Zener diode 82 during conduction of the controlled rectifier 56, the capacitor 94 can still rapidly charge up to the peak voltage point of the unijunction transistor 118, for it is not limited to a voltage level equal to the Zener voltage of the Zener diode 44, as is the capacitor 88. Thus, during synchronous motor operation, should the controlled rectifier 56 conduct due to transient conditions, the capacitor 94 will rapidly charge to the peak voltage of the unijunction transistor 118, and the unijunction transistor will fire to provide a gate pulse to the controlled rectifier 136. Then the circuit including the controlled rectifier 136 and the controlled rectifier 138 will operate as previously described to provide a gate pulse to the controlled rectifier 40 and the controlled rectifier 178, and conduction of the controlled rectifier 178 will operate to terminate conduction through the controlled rectifier 56. Thus the system will again be restored to normal operation.

It will be readily apparent that the present invention provides a novel and improved synchronous motor static starting control which operates effectively to provide motor field protection during acceleration of the motor to synchronous speed and which functions thereafter to monitor field control circuit conditions and to rapidly rectify any irregularity therein. The arrangement and types of components utilized within this invention may be subject to numerous modifications well within the purview of this inventor who intends only to be limited to a liberal interpretation of the specification and the appended claims.

What is claimed is:

1. A synchronous motor control for a synchronous motor having an alternating current armature, a direct current field winding, and a field winding excitation source comprising resistive discharge circuit means for said field winding, first control means connected between said field winding excitation source and said field winding and operative to prevent the flow of power from said field winding excitation source to said field winding during motor starting, second control means connected between said field winding and resistive discharge circuit means and operative during said motor starting to provide a path across said field winding through said resistive discharge circuit means, switch means connected between said field winding excitation source and said second control means, said switch means being operative upon receipt of a control signal to provide a bias signal from said field winding excitation source to said second control means, frequency responsive control means connected to sense the slip frequency of said motor, said frequency responsive control means operating at a relatively fixed portion of the slip frequency wave form when said slip frequency decreases to a predetermined value to provide an activating signal, and pulse transmitting means connected to receive said activating signal and operative upon receipt of said activating signal to provide a control signal to said switch means and first control means, said first control means operating in response to said control signal to permit power to flow from said field winding excitation source to said field winding and said second control means operating in response to the bias signal from said switch means to terminate the path across said field winding through said resistive discharge means.

2. The synchronous motor control of claim 1 wherein said second control means includes voltage responsive means connected to said field winding and conductive when the potential induced therein reaches a predetermined voltage level, a controlled rectifier having an anode to cathode electrode circuit connected between said field winding and said resistive discharge circuit means and a gate electrode connected to said voltage responsive means, said switch means being connected between said field winding excitation source and the cathode of said control rectifier means.

3. The synchronous motor control of claim 1 wherein said first control means is connected to form a series circuit with said field winding excitation source in parallel with said field winding, said first control means including a controlled rectifier switching means having an anode electrode connected to receive the output from said field winding excitation source, a cathode electrode connected to one side of said field winding, and a gate electrode connected to receive the control signal from said pulse transmitting means.

4. The synchronous motor control of claim 1 wherein field excitation monitoring control means is connected to said field winding to sense the power supplied to said field winding by said field winding excitation source, said excitation monitoring control means being operative upon termination of said power from said field winding excitation source with the motor at synchronous speed to provide an activation signal to said pulse transmitting means, said pulse transmitting means operating upon receiving said activation signal to provide a control signal to said switch means and first control means, said first control means operating upon receiving said control signal to establish a path to said field winding for said excitation source output.

5. The synchronous motor control of claim 1 wherein said frequency responsive control means includes capacitor means connected to charge during the positive half-cycle of field voltage induced in said field winding by said armature, and discharge during the negative half-cycle thereof, the charge on said capacitor means being a function of the induced voltage frequency, said pulse transmitting means including semiconductor means connected to said capacitor means, said capacitor means operating to initiate conduction of said semiconductor means when the capacitor charge on said capacitor means exceeds the peak voltage point of said semiconductor means, first bias means operative to bias said semiconductor means to prevent conduction thereof in response to said capacitor charge and second bias means operative to bias said semiconductor means to establish a peak voltage point which is lower than that established by said first bias means, said second bias means controlling said semiconductor means at the terminal portion of the wave form for the positive half-cycle of induced field voltage.

6. The synchronous motor control of claim 5 wherein field excitation monitoring control means is connected to said field winding to sense the power supplied to said field winding by said field winding excitation source, said field excitation monitoring control means operating upon termination of said power with the motor at synchronous speed and including first capacitor means connected to a source of charging potential, discharge semiconductor means connected across said first capacitor means and operative when conducting to dissipate the charge thereon, and second capacitor means connected to said field winding, said second capacitor means operating to maintain conduction of said discharge semiconductor means when power is supplied to said field winding by said excitation source, said first capacitor means being connected to said semiconductor means to initiate conduction thereof when the charge on said first capacitor means exceeds the peak voltage point of said semiconductor means.

7. The synchronous motor control of claim 5 wherein said first bias means includes voltage clipping means connected to receive and limit the magnitude of said positive half-cycle of induced field voltage.

8. The synchronous motor control of claim 5 wherein monitor control means is connected to said resistive discharge circuit means and is operative upon the occurrence of current flow therein after said motor reaches synchronous speed, said monitor control means including monitor capacitor means connected to charge in response to said current flow in said resistive discharge circuit means, said monitor capacitor means being connected to said semiconductor means to initiate conduction thereof when the charge on said monitor capacitor means exceeds the peak voltage point of said semiconductor means.

References Cited

UNITED STATES PATENTS 3,308,362   3/1967   Neumann et al. _____ 318—176
3,350,613   10/1967   Brockman et al. ___ 318—193 XR ORIS L. RADER, Primary Examiner G. F. RUBINSON, Assistant Examiner U.S. Cl. X.R.
318—183, 193